United States Patent
Larson

[11] 3,951,173
[45] Apr. 20, 1976

[54] METHOD AND APPARATUS FOR SEALING LARGE DIAMETER PIPES

[75] Inventor: Richard E. Larson, Minnetonka, Minn.

[73] Assignee: Cherne Industrial, Inc., Edina, Minn.

[22] Filed: Nov. 8, 1974

[21] Appl. No.: 522,303

[52] U.S. Cl. .................................... 138/97; 138/93
[51] Int. Cl.² ......................................... F16L 55/18
[58] Field of Search ............................... 138/97, 93

[56] References Cited
UNITED STATES PATENTS

| | | | |
|---|---|---|---|
| 2,843,154 | 7/1958 | Hosking | 138/93 |
| 3,103,235 | 9/1963 | Stringham | 138/97 |
| 3,269,421 | 8/1966 | Telford et al. | 138/97 |
| 3,593,749 | 7/1971 | Reardon | 138/97 X |
| 3,750,711 | 8/1973 | Conklin et al. | 138/97 |
| 3,834,422 | 9/1974 | Larson | 138/93 X |

FOREIGN PATENTS OR APPLICATIONS 212,715  3/1924  United Kingdom.................. 138/93

*Primary Examiner*—Richard E. Aegerter
*Assistant Examiner*—James E. Bryant, III

[57] ABSTRACT

An inflatable packer positionable in the interior of pipes for packing a sealant material into a void or joint in the pipe wall. Inflatable outer casings mounted on a support rim are utilized to seal off the area surrounding the void or joint. The support rim is constructed in sections which can be transported through a relatively small opening and utilized in a large diameter pipe. Sealant material injected into an open channel between the casings is forced into the void or joint by inflating an inner casing positioned between the outer casings. A flexible liner positioned between the sealant material and the inflatable casings prevents the sealant from adhering to the inflatable casings.

3 Claims, 4 Drawing Figures

METHOD AND APPARATUS FOR SEALING LARGE DIAMETER PIPES

BACKGROUND OF THE INVENTION

1. Field of the Invention

Method and apparatus for injecting a sealant material into a crack or pipe joint from the piper interior using an inflatable device.

2. Description of the Prior Art

Storm drains, sewers and various supply pipes are typically manufactured from concrete, clay, steel, plastics or similar materials and are assembled in sections. Such conduits generally are buried under ground. Because of the nature of the materials from which the pipes are constructed and because such pipes tend to shift with the swelling and movement of the ground due to frost and hydrostatic forces, leaks frequently occur in such pipes either by the cracking of the pipe material or by separation of the pipe sections at their joints.

Conduits of this type generally vary in size from several inches up to ten feet in diameter. In the past when pipes of this type have cracked or become separated at their joints such that leaks in the pipe occur, it was frequently necessary to excavate the area surrounding the pipe to repair it from the exterior or to replace the pipe section which was damaged.

In certain instances, it has been possible to repair small diameter pipes by using remote apparatus which is pulled through the pipe on a cable. Such apparatus may incorporate expandable devices and injection systems which force sealing material into the crack or joint which is being repaired. These devices are generally designed for use in pipes of relatively small diameter. Because such devices must be remotely controlled, it is necessary to provide relatively complex and expensive support equipment for guiding and operating the sealing device from outside of the pipe. Such equipment has necessitated the use of personnel having a high degree of skill and training.

In addition to being repaired by excavation and replacement of damaged pipe sections, larger pipes are frequently repaired by the use of caulking guns or similar devices which are carried into the pipe by work personnel and used to inject a sealant material into cracks or pipe joints. However, hand-held caulking devices have very limited usefulness in the repair of deep cracks in the pipe casing, in the repair of extended cracks or the packing of pipe joints. In the case of deep or extended cracks and joint openings, it is not possible to project a large amount of caulking material deep into the void because means are not available to apply suitable pressure to the caulking material. The pressure which is provided by the caulking gun is lost at the gun nozzle and thus continuous pressure can not be applied to the caulking material to pack it deeply into the joint or to pack large amounts of the caulking material.

Present technology provides various two-component caulking materials which utilize two substances that expand when combined. Such materials would be extremely useful in sealing cracks and joints in various pipes if means were provided to adequately isolate the crack or joint area so that the pressure which the two-component sealant builds up when mixed is suitably contained to force the caulking material into the void or joint. Presently available sealing devices generally do not provide means for adequately isolating and sealing voids or joints in large diameter pipes so that these two-component expandable sealing materials could be utilized.

SUMMARY

The present invention discloses a method and apparatus for efficiently and economically packing a sealant material into a crack or joint in the interior surface of a pipe. A support rim constructed in segments is positionable in the interior of the pipe being repaired with its exterior surface spaced apart from the interior surface of the pipe. Two outer inflatable casings surround the support rim and are spaced apart to form an open channel between them. An inner casing is positioned around the exterior surface of the support rim in the open channel between the outer casings. The apparatus is positioned with the open channel generally adjacent the crack or joint being sealed.

When the outer casings are inflated they occupy the space between the support rim and the interior surface of the pipe forming a sealed barrier on each side of the crack or joint area with an open channel between them. A sealant material is injected through an injection tube into the open channel. A flexible liner positioned between the inner casings and the sealant material prevents the sealant from adhering to the casing. When the inner casing is inflated, it reduces the volume of the sealed channel between the inflated outer casings forcing the sealant material out of the channel into the void being sealed. By adequately sealing off the area surrounding the crack or joint, the sealant material is forced deeply into all portions of the crack or joint void. The inflatable packer is removed by deflating the three casings. It can then be repositioned adjacent the next crack or joint to be sealed. The Applicant has found his invention to be particularly useful in sealing large pipes having a diameter of 24 inches up to 120 inches. Even larger pipes could be repaired using the invention. The present invention is practiced without use of complex support vans and their associated highly skilled personnel.

DETAILED DESCRIPTION OF THE PREFERRED EMBODIMENT

Referring to FIGS. 1–4, wherein like numerals refer to like structual elements, the present invention incorporates an inflatable sealant packer 1 which is utilized to force a sealant material 2 into the void 3 of a crack or joint occurring in a pipe 4.

Figure 1:
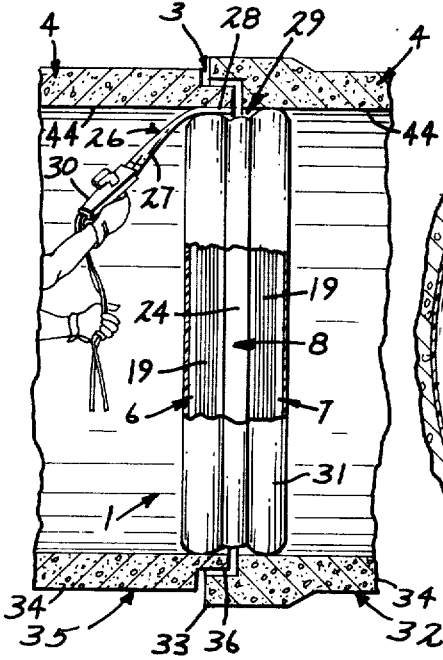
FIG. 1 is a view partially in section and partially in elevation showing the present invention in an operational position.
Figure 2:
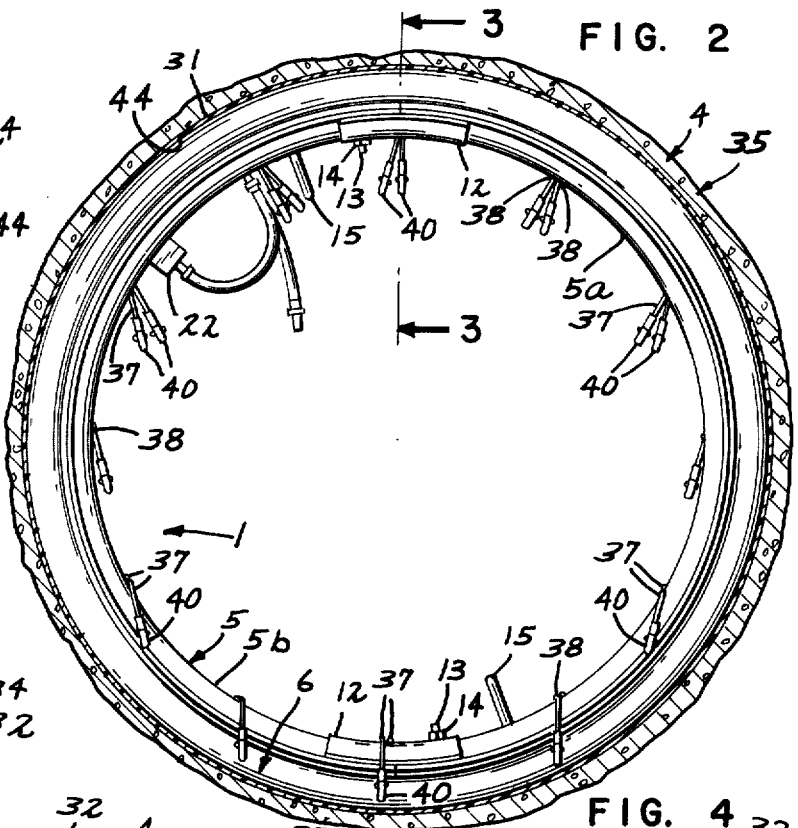
FIG. 2 is a sectional view as seen generally from the line 2—2 in FIG. 1 on an enlarged scale.

In the preferred embodiment shown in the Figures, the sealant packer 1 is positioned adjacent a void 3 occurring at the joint between two interlocking pipe sections, each designated by the numeral 4. The configuration shown in FIG. 1 is typical of the interlock design of large pipe sections such as in storm drains or sewer pipes. Each of the pipe sections 4 has a straight segment 34, a spigot end 35 having a reduced diameter spigot 36 at one end, and a bell end 32 with a bell flange 33 extending upwardly from the straight segment. In constructing the sewer or pipe line, the pipe sections 4 are interlocked end-to-end with the spigot 36 inserted beneath the bell flange 33. In some installations a joint sealing ring (not shown) or similar device will be inserted between the bell flange 33 and the spigot 45 to provide a tight seal between the adjoining pipe sections. It should be noted that while the pipe shown in the preferred embodiment is circular in cross-section, the present invention may also be practiced in pipes having a non-circular cross-section. In addition the present invention may be utilized to force a sealant material into either a joint opening between adjacent pipe sections as is shown in the Figures or into a crack or fissure (not shown) occurring in the interior surface of the pipe.

In the preferred embodiment shown in FIGS. 1–4, the inflatable sealant packer 1 comprises a support rim 5 which has a circular planform matching the shape of the interior surface of the pipe 4. It is the purpose of support rim 5 to support a first outer inflatable casing 6, a second outer inflatable casing 7 and an inner inflatable casing 8 positioned between the outer casings (see FIGS. 3 and 4). Support rim 5 is comprised of two sections, 5a and 5b. Sections 5a and 5b can be inserted into the interior of pipe 4 by means of a manhole (not shown) or similar opening which may have a diameter considerably smaller than the interior diameter of the pipe 4 which is being repaired. Thus, by constructing support rim 5 from two separate sections 5a and 5b, the inflatable sealant packer 1 may have an assembled diameter of up to ten feet and still be easily transported through a relatively small manhole opening.

After the sections 5a and 5b have been positioned in pipe 4, they are assembled into a unitary structure by means of bracing elements, each designated by the numeral 12, which overlap the ends of adjoining sections 5a and 5b. Each of bracing elements 12 has a contour matching the contour of support rim 5 and is welded to one end of the support rim section 5a (or 5b) and is attachable to the opposite end of the adjoining support rim section 5b (or 5a) by means of bolts 13 and nuts 14. More than two sections may be utilized for support rim 5 and means other than bracing elements 12 may be utilized for interconnecting the various sections where appropriate. A pair of opposed handles 15 (see FIGS. 2–4) are provided, one on each of sections 5a and 5b, for handling the support rim 5. Various other devices may also be utilized (not shown) for handling the support rim 5 where appropriate.

In the preferred embodiment, support rim 5 has a scalloped exterior contour which includes a first outer casing recess 9, an inner casing recess 11 and a second outer casing recess 10. Outer casing recess 9 consists of a curved indentation formed in the outer surface 39 of support rim 5 generally adjacent the outside edge of the support rim. It is the purpose of casing recess 9 to retain a portion of inflatable outer casing 6 therein to prevent lateral movement of the casing 6 which may tend to occur as the inner casing 8 is inflated. Similarly, the inner casing recess 11 is formed at the midpoint of support rim 5 to receive a portion of inner casing 8 within it to prevent its lateral shifting when it is inflated. Outer casing recess 10 is provided at the opposite edge of support rim 5 from recess 9 and has a generally curved contour to contain a portion of outer casing 7. While the preferred embodiment shown in the Figures depicts a support rim 5 constructed from a relatively thin sheet of steel in the form of a corrugated contour which provides the necessary casing recesses (9–11), other cross-sectional designs for support rim 5 may also be utilized where suitable casing recesses are provided.

Support rim 5 may be manufactured from various materials, including steel, aluminum or plastics which are sufficiently rigid to maintain the desired cross-sectional shape and resists the compressive forces which result from inflation of the various casings (6–8). The corrugated shape of support rim 5 shown in the preferred embodiment provides additional compressive strength to the rim due to the corrugation ribs. The applicant has found that support rims having diameters from 27 to 120 inches may be utilized effectively using galvanized sheet steel. Other sizes may also be constructed using various suitable materials.

Figure 3:
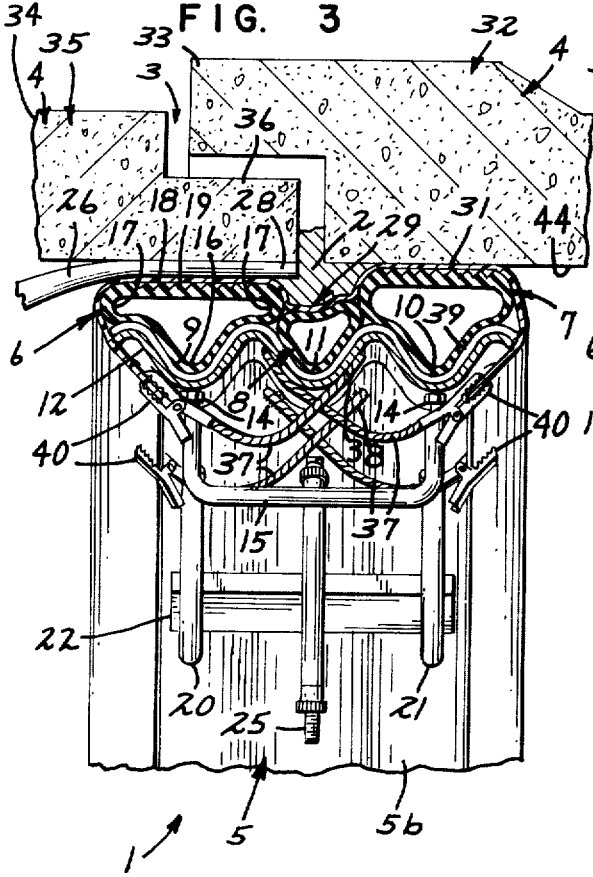
FIG. 3 is a detailed sectional view as seen from the line 3—3 in FIG. 2 on a greatly enlarged scale.
Figure 4:
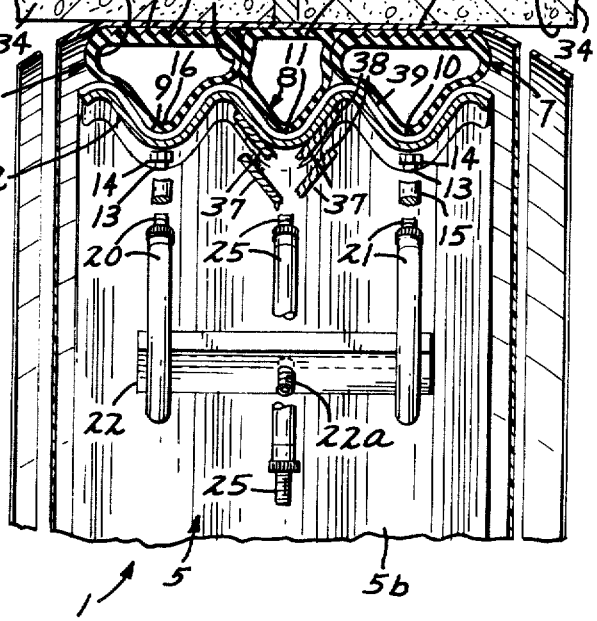
FIG. 4 is a view similar to FIG. 3 showing different steps of the operation with portions broken away and shown in section.

The outside diameter of support rim 5 is selected so that when the support rim 5 is positioned in the interior of the pipe to be repaired, a space exists all the way around the support rim 5 between its outer surface 39 and the interior surface of the pipe 4 being repaired. Positioned around the exterior of support rim 5, generally concentric with the support rim, are spaced apart outer inflatable casings 6 and 7. In the preferred embodiment, each of outer casings 6 and 7 are identical. Thus, a detailed description of casing 6 will serve to describe both casings 6 and 7. Referring to FIGS. 3 and 4, outer casing 6 is a continuous flexible casing which extends around the perimeter of support rim 5 adjacent rim exterior surface 39 and generally adjacent an outside edge of the rim. In the preferred embodiment, the cross-section of outer casing 6 has a V-shape with opposed side portions 17, a bottom lobe portion 16 and an outer casing surface 18 (see FIGS. 3 and 4). When outer casing 6 is uninflated, it lies adjacent the support rim 5 with a portion of the casing in the casing recess 9. Similarly, outer inflatable casing 7 also lies adjacent support rim 5 and within casing recess 10 when it is uninflated. When casing 6 is inflated, its bottom lobe portion 16 abuts support rim surface 39 and its outer surface 18 abuts the interior surface 44 of sewer pipe 4. With sufficient pressure in outer casing 6 (e.g. 25 psi), a tigh seal between the flexible casing 6, interior pipe surface 44 and support rim surface 39 is achieved. Similar sealing between support rim 5 and pipe interior surface 44 is achieved when outer inflatable casing 7 is inflated.

Valve stems 20 and 21 are attached to each of outer casings 6 and 7, respectively, and extend through openings (not shown) in support rim 5. In the preferred embodiment, a manifold 22 interconnects valve stems 20 and 21 and has a spigot 22a which is attachable to a source of compressed gas (not shown) so that outer casings 6 and 7 can be inflated simultaneously.

Outer casings 6 and 7 are sized and positioned adjacent support rim 5 such that when they are fully inflated an open channel 29 is maintained around the circumference of support rim 5 between outer casings 6 and 7. Positioned in channel 29 between outer casings 6 and 7 is inner casing 8. It is also the purpose of open channel 29 to provide a chamber into which a sealing compound can be injected for subsequent packing into a void or joint occurring in the pipe 4, as will be described in detail later. As is shown in FIG. 3, inner casing 8 is a continuous flexible casing which extends around the perimeter of support rim 5. Inner casing 8 has a generally circular cross-section with a bottom portion 23 which is contained in casing recess 11. When inner casing 8 is uninflated, it lies generally adjacent support rim 5 and occupies only the bottom portion of the open channel 29 (see FIG. 3). When inner casing 8 is inflated, it occupies substantially all of the volume of open channel 29 as is shown in FIG. 4. A valve stem 25 is attached to inner casing 8 and extends through an opening (not shown) in support rim 5. One end of valve stem 25 can be attached to a source of compressed gas (not shown) to inflate inner casing 8.

In the preferred embodiment, each of casings 6, 7 and 8 is constructed of a flexible material such as rubber. Other suitable non-porous flexible materials may also be utilized where appropriate. The various casing recesses (9–11) and the inherently abrasive character of rubber provide means for retaining the casings in place on support rim 5. Other supplemental means for attaching the various casings to support rim 5 may also be utilized where appropriate. In addition, the casings 6–8 may be in the form of a single casing having three compartments.

When the sealant packer 1 is located in the interior of a pipe 4, it is positioned with open channel 29 generally adjacent the void 3 which is to be packed with a sealant material 2 (see FIG. 1). Prior to inflating outer casings 6 and 7, an injection tube 26 would be inserted across one of the outer casings (6 or 7) with an outlet end 28 positioned in open channel 29. A second inlet end 27 would be located outside of casing 6 where it would be attached to an injection device 30 which communicates with a pressurized source of sealant material (not shown). In order to prevent the sealant material 2 from adhering to any of casings 6–8, a flexible sheath 31 is utilized as a liner. As is shown in FIG. 3, flexible liner 31 is positioned between the top surfaces of casings 6–8 and interior pipe surface 44. Injection tube 26 is inserted between flexible liner 31 and interior pipe surface 44. Thus, when sealant material 2 is injected through injection tube 26 into open channel 29, the flexible liner 31 prevents it from contaminating the surface of casings 6–8. The Applicant has found that thin plastic films which do not adhere to the adhesive, including polyethylene sheeting, provide an excellent material for flexible liner 31. To hold flexible liner 31 in place, a plurality of clamps 40 are each attached to cables 37 which are attached to the interior surface of support rim 5 at various locations 38. By stretching flexible liner 31 over the exterior surface of sealant packer 1, the edges of the flexible liner 31 are pulled inwardly and clamped in place by clamps 40. Other appropriate attachment means may also be utilized. In addition, where appropriate casing materials or coated casings are utilized, liner 31 is not necessary. But, the use of liner 31 makes it easily replaceable if worn and allows its variation if different sealant chemicals are used.

After injection tube 26 has been inserted into open channel 29, outer casings 6 and 7 are inflated. When inflated, casings 6 and 7 exert sufficiently strong abutting forces against support rim 5 and pipe surface 44 to seal off open channel 44. The Applicant has found that the sealant packer 1 can be most advantageously positioned if casings 6 and 7 are inflated simultaneously. With the inner casing 8 left uninflated and laying against the exterior surface 39 of support rim 5 (see FIG. 3), the sealant material 2 is injected through injection tube 26 into open channel 29. Because the sealant material 2 is a viscous fluid, it will tend to occupy the entire volume of open channel 29 around the circumference of inner casing 8. This migration of the sealant material 2 is increased when a self-expanding sealant material is utilized. Such self-expanding sealant materials are generally formed from two components which are inert individually but which react with one another when combined to form an expanding sealant material. By sealing off the area surrounding open channel 29, the exposure force of a self-expanding sealer is contained so that it forces the sealant into the adjacent crack or joint being repaired.

After the outer casings 6 and 7 have been inflated and the sealant material 2 injected into open channel 29, injection tube 26 is removed and inner casing 8 is inflated. As inner casing 8 inflates, the upper portion 24 moves toward the interior surface 44 of pipe 4. This forcible movement of inner casing 8 forces the sealant material 2 out of the open channel 29 into the void 3 until all of the sealant material has been injected deeply into the open area. The inflation of inner casing 8 and the movement of sealant 2 into void 3 is shown in succession in FIGS. 3 and 4. Packing of sealant material 2 into void 3 occurs around the entire circumference of the sealant packer 1. This allows sealant material 2 to be packed deeply into any joint or void occurring over any length of the circumference of pipe interior surface 44. This packing of the sealant 2 is further improved if the sealant material is a self-expanding type which expands when two components of the sealant are combined and provides additional force for filling all portions of the void. The Applicant has found that it generally takes only 4–5 minutes for the sealant to be injected and less than 20 minutes for it to properly set.

As inner casing 8 is inflated and sealant material 2 expands, a lateral force is exerted on each of outer casings 6 and 7. To affectuate a tight seal between the outer casing surface 18 and the pipe interior surface 44, and to resist the lateral forces exerted by the inflation of inner casing 8, a plurality of tread indentations, each designated by the numeral 19, is provided in surface 18 of outer casings 6 and 7 which abuts the interior pipe surface 44. Tread indentations 19 are V-shaped grooves in surfaces 18 as shown in FIGS. 1 and 3–4.

After the sealant material 2 has been packed into the void 3 and allowed to set properly, each of the casings 6–8 is deflated and the flexible liner 31 is removed. The sealant packer 1 can then be moved to another location where the same process is repeated for sealing another crack or joint area. When the entire pipe has been repaired, the support rim 5 is again disassembled by unbolting the bracing elements 12 and the various support rim segments 5a and 5b can be removed from the pipe through a manhole or similar opening.

The Applicant's invention also provides a useful and novel method for sealing cracks or joints in the interior surface of pipes. The Applicant has found that this can be accomplished by positioning a support rim in the interior of the pipe to be repaired with a segment of the rim exterior surface positioned generally adjacent the crack or joint to be sealed. The diameter of the support rim is selected so that the exterior surface of the support rim is spaced apart from the interior surface of the pipe being repaired.

The Applicant has found that it is desirable in practicing this method to construct the support rim from various segments so that a support rim having a large diameter can be brought into the pipe through a relatively small manhole opening.

Two outer inflatable casings are positioned around the exterior of the support rim. The casings are spaced apart on the support rim to provide an open channel between them which extends around the circumference of the support rim. This open channel is positioned generally adjacent the crack or joint to be filled with a sealant material. An inner third inflatable casement is positioned around the support rim between the two opposed outer casings. The Applicant has found that it is desirable to provide V-shaped contours to the outer casings and suitable casing recesses in the exterior surface of the support rims so that the bottom portion of each of the inflatable casings is contained in the casing recesses. This helps retain the casings in preselected positions on the support rim.

A thin sheet of flexible material is positioned around the exterior of the three casings to prevent the sealant material from adhering to the casings. The ends of the flexible liner are fastened to clamp elements on the interior surface of the support rim to firmly hold the flexible liner in place. An injection tube is inserted across one of the outer casings and extends between a source of sealant material and the open channel with is provided between the two outer casings and adjacent the inner casing. The two outer casings are then inflated. The Applicant has found that it is desirable to inflate them simultaneously. By inflating the outer casings, the open channel area between them is effectively sealed and adjoins the crack or joint being repaired. A sealant material is then injected under pressure through the injection tube into the open channel adjacent the deflated inner casing. It is desirable that the sealant material which is injected be a self-expanding material which is activated when two sealant components are combined.

After the sealant material has been injected into the open channel 29, the injection tube is removed and the inner casing is inflated. As the casing inflates, its upper portion moves toward the interior surface of the pipe, filling the open channel and forcing the sealant material into the adjacent void.

After the sealant material has been allowed to properly set, the three casings are deflated. This allows the packer apparatus to be moved to another repair location. The flexible liner is then removed from the interior surface of the pipe.

The Applicant has also found that the apparatus and method of his invention can be utilized with the support rim oriented generally vertically, such as in a horizontal pipe, or with the support rim oriented generally horizontally as in a vertical manhole shaft. This allows joints or extended cracks in either horizontal or vertically oriented pipes to be repaired by practicing Applicant's invention.

What is claimed is:

1. An inflatable sealant packer for forcibly packing sealant into voids occurring at the interior surface of pipes, comprising:
   a. at least two separate rim sections, each of said rim sections having opposed interior and exterior surfaces which are bounded by opposed ends and opposed lateral edges, said rim sections having an arcuate shape when viewed from the lateral edges;
   b. said rim sections being attachable to one another to form an enclosed support rim having a generally circular shape when viewed from the lateral edges of said rim sections, said support rim having an exterior surface;
   c. bracing means for fixedly attaching said rim sections to one another in end-to-end relationship to form an enclosed, generally circular support rim thus allowing said support rim to be inserted into the interior of a pipe in sections and to subsequently be assembled into an enclosed support rim having a diameter greater than the physical dimension of any one support rim section;
   d. first and second inflatable outer casings, each of said casings positionable around the exterior of said support rim generally coaxial with said support rim and spaced apart on the exterior rim surface to form an open channel there between which is suitable for positioning adjacent a void in the wall of a pipe which is intended to be filled with a sealant material, when inflated each of said outer casings having a curved contour with a protruding bottom lobe portion which provides a discontinuous surface to the exterior of said outer casing;
   e. portion of the surface of each of said outer casings containing tread indentations to abut the interior surface of a pipe adjacent which said outer casing may be positioned, thereby increasing the friction between said outer casing and a pipe interior surface to resist lateral movement of the inflated outer casing when lateral forces act on said outer casing;
   f. said upper rim exterior surface being a continuously curved surface, said curved surface defining first and second outer recesses and a third inner recess, each of said recesses having a curved contour to retain therein a portion of the curved contour of said inflatable casings to retard lateral movement of said casings, said inner and outer recesses positioned in side-by-side relationship, each of said inner and outer recesses extending circumferencially around the entire perimeter of said support rim, there being interspaced between each of said outer recesses and said inner recess a curved surface protrusion which serves to partially define said recesses;
   g. conduit means in communication with said outer casings for conducting compressed gas from a source of compressed gas into said outer casings to allow the outer casings to be controllably inflated;
   h. said outer casings each being inflatable to a size wherein the bottom lobe portion of each casing forcibly abuts the curved surface of said support rim outer recess and wherein the treaded surface portion of each casing forcibly abuts the interior surface of a pipe adjacent which said outer casing may be positioned to thereby create two annular seals between said support rim and a pipe interior surface portion which may be adjacent thereto and providing an open channel between said outer casings;
   i. an inflatable inner casing being positionable in said open channel between said outer casings and being at least partially contained within said inner recess, said inner casing occupying only a portion of the depth of said open channel when uninflated, thereby permitting a sealant to be introduced into the unoccupied portion of the open channel;
   j. conduit means in communication with said inner casing for conducting compressed gas from a source of compressed gas into said inner casing to allow said inner casing to be controllably inflated;

k. said inner casing being inflatable to a size wherein it fills said open channel between said outer casings, thereby expelling any sealant material which may be present in the open channel into a pipe void which may be positioned adjacent said inner casing;

l. a removable flexible sheet positionable over the portions of said inner and outer casings which are furthest removed from said support rim to prevent adherence to said inner and outer casings of any sealant material which may be injected in the open channel between said outer casings, said flexible sheet removeable and replaceable when contaminated with sealant;

m. means carried by said support rim for removably holding said flexible sheet in place over said inner and outer casings, said means including:
 i. a plurality of cable-like members which are connected to said support rim; and
 ii. a plurality of securing members connected to said cable-like devices, said securing members being removably attachable to portions of said flexible sheet to hold said flexible sheet in place over said inner and outer casings with respect to said support rim.

2. The sealant packer of claim 1 wherein said bracing means include a bracing element attached to one end of each of said rim sections, each bracing element having one end integrally attached to one end of a rim section and a second end, said bracing element second end and the adjoining end of a second rim section containing bolting means for connecting said bracing element to the adjoining end of the second rim section thereby fixedly joining said rim sections together to form a rigid support rim.

3. A method for sealing voids occurring in the interior surface of pipes, comprising the steps of:
 a. positioning individual support rim sections within a pipe which is to be sealed, said support rim sections being insertable through a restricted opening to the pipe which is to be sealed which has a diameter smaller than the pipe which is to be sealed such as a manhole opening which leads to a sewer pipe having a diameter larger than the manhole;
 b. fixedly connecting the support rim sections to one another in end-to-end relationship to form an enclosed support rim having an outside diameter smaller than the inside diameter of a pipe into which it is inserted for sealing purposes;
 c. positioning first and second outer inflatable casings on the exterior surface of the support rim with the bottom portion of each of the inflatable outer casings being positioned in a recess contained in the outer surface of the support rim;
 d. positioning the first and second outer inflatable casings on the exterior portions of the support rim such that an open channel is left between the outer inflatable casing;
 e. positioning an inner inflatable casing on the exterior surface of the support rim in the open channel which is formed between the first and second outer casings, said inner casing being positioned in a recess formed on the outer surface of the support rim;
 f. positioning the support rim inside a pipe which is to be repaired with the support rim positioned generally coaxially with the interior surface of the pipe and with the inflatable inner and outer casings being positioned generally adjacent the interior surface of the pipe;
 g. locating the support rim in the pipe to be repaired with the first and second outer inflatable casings positioned on opposite sides of a void in the interior pipe surface which is to be repaired, thereby forming a barrier on each side of the void between the support rim and the interior pipe surface;
 h. placing a flexible non-adhering sheet of material between the inner and outer casings and the interior surface of the pipe which is to be repaired;
 i. attaching securing members which are connected to the support rim to portions of the flexible sheet to hold the flexible sheet in position on the support rim;
 j. inflating said first and second outer casings until portions of their surfaces abut the support rim outer surface and also the interior surface of the pipe in which the support rim is positioned to create two annular seals between the support rim and the interior pipe surface which have an open channel between them, the open channel being generall adjacent a void in the interior pipe surface which is to be repaired;
 k. introducing a sealant material into the open channel between the first and second inflated casings generally adjacent the void in the interior pipe surface which is to be repaired with the sealant;
 l. inflating the inner casing to fill the open channel between the first and second outer casings and forcing the sealant from the open channel into the void in the interior surface of the pipe which is being repaired;
 m. deflating the inner and outer casings to a point where they do not abut the interior surface of the pipe which is being repaired; and
 n. removing the support rim from the interior pipe surface adjacent the position of a void which was to be repaired.

* * * * *